3,111,240
PLASTIC CONTAINER AND CLOSURE
MEANS THEREFOR
Aldean W. Whitton, Jr., Glenview, Ill., assignor to American Hospital Supply Corporation, Evanston, Ill., a corporation of Illinois
Filed Jan. 16, 1961, Ser. No. 82,771
2 Claims. (Cl. 220—67)

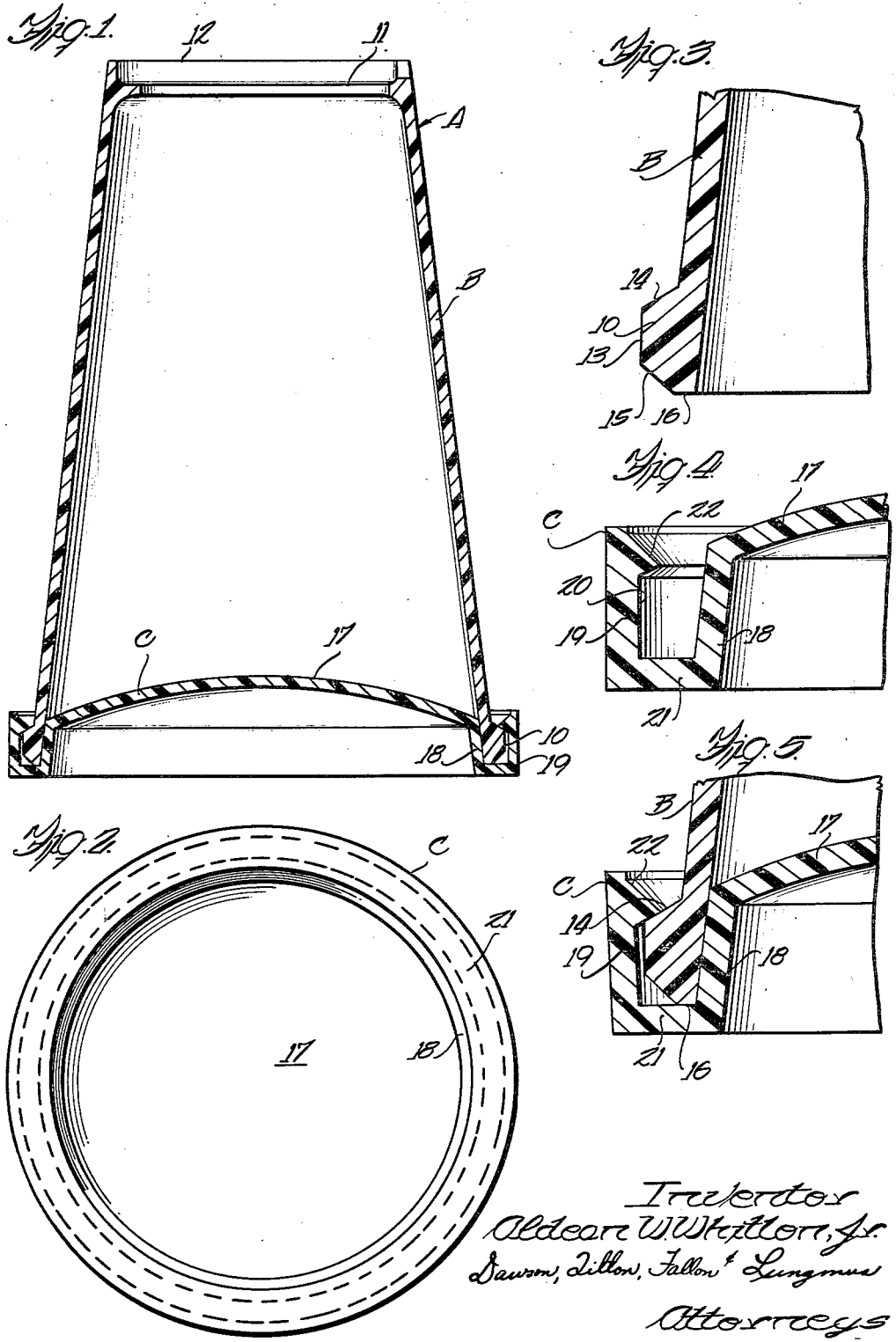

This invention relates to a plastic container which is particularly useful in hospitals, clinics, and the like as a disposable urine specimen container, and more specifically to the bottom closure means for such a container.

The present application is a continuation-in-part of my copending application, Serial No. 789,625, filed January 28, 1959, now Patent No. 2,982,450, issued May 2, 1961.

The main object of the present invention is to provide a resilient plastic closure for a container body which may be easily and quickly snapped in place and which will form an extremely effective liquid-tight seal with the body to prevent leakage of fluids contained therein. Specifically, it is an object to provide a resilient plastic closure for an open-bottomed container which cooperates with the lower wall portions of the container body to provide a seal which increases in effectiveness as internal pressures tending to break the seal are increased.

Other objects will appear from the specification and drawings in which:

FIGURE 1 is a vertical sectional view of a container equipped with a bottom closure embodying the present invention;

FIGURE 2 is a bottom view of the container illustrated in FIGURE 1;

FIGURE 3 is an enlarged and broken sectional view showing details of the container body's lower portion;

FIGURE 4 is an enlarged and broken sectional view showing details of constructions of the closure element;

FIGURE 5 is an enlarged and broken vertical sectional view showing the container body and closure element in assembled condition.

In the structure illustrated in FIGURE 1, the letter A generally designates a container having a body B and a bottom closure or base C. Each part of the two-piece container may be formed entirely of plastic material. Preferably, the body is formed from a relatively hard or rigid plastic such as polystyrene while the closure C is formed from a more resilient plastic such as polyethylene. Also, it is preferred that the plastic material used in forming the container, and particularly the body thereof, be transparent rather than opaque in character. As used in this specification, the word "transparent" refers not only to clear plastics but also to plastics which are sufficiently transparent or translucent to permit inspection of the contents of the container through the walls thereof.

As shown in FIGURE 1, the container body B is generally frusto-conical in shape and is open at both its bottom and its top. There are no external projections interrupting the substantial smooth outer surface of the body except for a circumferentially-extending rim or bead 10 at the lower end thereof. Similarly, the interior surface of the hollow conical body is also substantially smooth and uninterrupted except for an annular and inwardly extending shoulder 11 spaced slightly below the body's upper edge 12. Thus, the body unit is readily adapted for stacking and any desired number of container bodies may be arranged in nested relation to facilitate handling, shipment and storage. To conserve space at the site of intended use, it is desirable to store the container bodies in nested relation and then assemble the parts as each container is needed.

Referring to the enlarged view of FIGURE 3, it will be seen that the circumferential bead 10 has a cylindrical side surface 13, an upper bearing surface 14 which slopes downwardly and outwardly, and an angled under surface 15 which inclines downwardly and inwardly and which terminates adjacent the narrow annular bottom surface 16.

Base C is generally circular in shape and has a dome-shaped central portion 17 and a pair of inner and outer side wall portions 18 and 19. The side wall portions are concentrically disposed and are spaced apart to define an annular recess or channel 20 therebetween. A narrow annular intermediate or connection portion 21 joins the bottom ends of the side walls 18 and 19, and the upwardly and inwardly sloping side wall 18 merges at its top with the domed central portion 17. Thus, when the parts are assembled as shown in FIGURES 1 and 5, the central portion 17 is disposed within the body B at a space distant above the body's bottom surface 16, the inner wall portion snugly engages the inner lower surface of the body, and the intermediate portion 21 is in sealing surface contact with the body's bottom surface 16.

As illustrated most clearly in FIGURE 4, adjacent the top of the outer wall portion 19 is an annular inwardly projecting lip 22 providing a downwardly and inwardly sloping upper surface and an inwardly and upwardly inclined under surface. It will be noted that the inclination of the lip's under surface is substantially the same as the slope of the bead's upper surface 14 (FIGURE 5). In the illustration given, both surfaces are inclined at approximately 30 degrees from the horizontal although it will be understood that variations from this angle of inclination may be made while at the same time achieving substantially the same results, as will be brought out more fully as the specification proceeds.

As indicated in FIGURE 5, the internal diameter of the closure's outer wall portion 19 is the same or slightly greater than the maximum diameter of the bead of body B. However, the internal diameter of the outer wall portion measuerd at the inner edge of lip 22 is substantially smaller than the outer diameter of bead 10. In addition, the distance between the lower edge of the lip's under surface and the upper surface of the base's intermediate portion 21 is slightly less than the corresponding vertical distance between the lower edge of the bead's upper surface 14 and the bottom surface 16 of the container body. The result is that when the parts are assembled the vertical dimensions of the channel between lip 22 and wall 16 are not quite large enough for completely accommodating the bead 10 without some distortion of the resilient plastic base. The outer wall 19 of the base tends to stretch outwardly in response to outward forces imposed on the lip by the inclined surface 14. Lip 22, in resisting this stretching action, bears inwardly upon surface 14 and, in attempting to ride inwardly and upwardly on that surface, cams the bead downwardly into forceful sealing contact with intermediate wall portion 21 of the base. Thus, two important secondary seals are formed between the parts, one occurring between the lower surface 16 of the body and the upper surface of the closure's intermediate portion 21, and the other occurring between the inclined surfaces of the lip and bead. With reference to the seal between bottom surface 16 and the closure member, it will be noted that the unit pressure between the contacting surfaces is relatively great and produces a tight seal between the parts because of the small surface area provided at the bottom of the body B.

As previously indicated, wall portion 18 of the resilient plastic base bears tightly against the body's inner surface and thereby forms the primary seal between the parts. The stiffness of the body, especially where it is formed from a rigid plastic, combined with the inward force exerted by wall 19 in attempting to return to its original position, prevents outward movement of the body's lower-portion in response to the outward force imposed by wall portion 18.

The dome-shaped central portion 17 of the closure is capable of limited flexure in vertical directions because of the natural resiliency of the plastic material from which the closure is formed. When the container is filled or partially filled with fluid, the weight of the contents exerts a downward force upon the domed central portion in the direction of the arrow shown in FIGURE 1 with the result that the dome-shaped central portion tends to assume a flattened condition and, in so doing, increases the force exerted by inner wall portion 18 against the inner surface of the body's lower portion. Consequently, the parts become even more tightly sealed when the container is filled with liquid. While it might be thought that the application of a force upon central portion 17 in a direction opposite to the direction represented by the arrow (as might occur in handling a filled or partially filled container) might tend to draw inner wall portion 18 inwardly and thereby reduce the effectiveness of the seal between the parts, it is to be observed that such a force would at the same time urge the lower intermediate portion 21 of the closure into tighter contact with the bottom surface 16 of the body so as to prevent escape of liquid from the container.

Since the container is formed from a transparent or translucent plastic material, a laboratory technician may readily examine the contents to see whether there is any sediment, blood, etc. in the specimen. Furthermore, a hydrometer may be inserted into the specimen within the container to obtain a specific gravity reading without the necessity of pouring the liquid out into a clear glass container to obtain such readings. In this connection, it will be noted that if the weight of any instruments inserted into the container should be supported by the domed bottom wall 17, the tendency of that wall to flex downwardly will simply serve to increase the sealing action between the parts in the manner already described.

For effective sealing action between the closure and the container body, it is important that the dome-shaped central portion 17 be disposed within the body and above the bottom surface 16 thereof. Preferably, the vertical dimensions of inner wall portion 18 are substantially the same as the distance between lip 22 and the bottom of the closure.

While the parts are locked tightly together in liquid-tight sealing relation once they have been fully assembled, the actual assembly of the parts may be accomplished quickly and with very little effort. If desired, the parts may be assembled by supporting the container body in inverted condition and then urging the closure downwardly over the body's bead end. This operation may be most easily performed by pressing the central portion 17 of the inverted closure downwardly with the thumbs of both hands. When the sloping surface of lip 22 engages the inclined surface 15 of the body, the resulting camming action causes the outer wall portion 19 to flex or stretch outwardly while at the same time compressing the beaded portion of the body. Then, when the parts are in the condition illustrated in FIGURE 1 and the applied pressure (in the direction opposite the direction of the arrow) is removed, inner wall portion 18 forcefully contacts the inner surface of the body to seal the parts together.

While in the foregoing I have disclosed an embodiment of the present invention in considerable detail for purposes of illustration, it will be understood by those skilled in the art that many of these details may be varied without departing from the spirit and scope of the invention.

I claim:

1. A container comprising a hollow body having an open bottom, said body providing above the bottom thereof an external circumferential bead having an upper annular bearing surface, and a bottom closure for said body formed from resilient plastic material, said closure having a central wall portion disposed within said body above the bottom thereof, an inner wall portion extending downwardly from said central wall portion along the inner surface of said body, a generally horizontal intermediate portion extending outwardly from the bottom of said inner wall portion, and an upstanding outer wall portion merging with said intermediate portion and providing an inwardly-extending lip adjacent the upper end thereof, the bottom of said body being received between said inner and outer wall portions of said closure, said inner wall portion of said closure and the bottom of said body having mating and upwardly and inwardly inclined frusto-conical surfaces, said lip having outwardly and downwardly inclined undersurface bearing downwardly and inwardly against the bead's bearing surface, said outer wall portion of said closure being flexed outwardly and having its inner surface spaced outwardly from the outer surface of said bead, said outer wall portion being in a state of tension wherein the lip thereof cams the bead of said body downwardly to maintain the said inclined frusto-conical surfaces in tight sealing engagement with each other and to urge the bottom of said body into tight sealing engagement with said intermediate wall portion.

2. The structure of claim 1 in which the upper annular bearing surface of said bead slopes downwardly and outwardly, the distance between the outermost limits of said bearing surface and the bottom surface of said body being greater than the distance between the outermost limits of the lip's inclined undersurface and the upper surface of the closure's intermediate wall portion.

References Cited in the file of this patent

UNITED STATES PATENTS

| | | |
|---|---|---|
| 1,516,582 | Spalding | Nov. 25, 1924 |
| 2,331,449 | Wittenberg | Oct. 12, 1943 |
| 2,717,619 | Whitman | Sept. 13, 1955 |
| 2,752,971 | Tupper | July 3, 1956 |
| 2,767,711 | Ernst | Oct. 23, 1956 |
| 2,914,104 | Jocelyn | Nov. 24, 1959 |
| 2,958,439 | Yochem | Nov. 1, 1960 |
| 2,982,450 | Whitton | May 2, 1961 |
| 3,023,926 | Wilke | Mar. 6, 1962 |

FOREIGN PATENTS

| | | |
|---|---|---|
| 725,882 | Great Britain | Mar. 9, 1955 |
| 568,297 | Italy | Oct. 26, 1957 |